(12) United States Patent
Xiao (10) Patent No.: US 9,726,963 B1
(45) Date of Patent: Aug. 8, 2017

(54) QUICK CONNECTION STRUCTURE

(71) Applicant: Zhongshan Dashan Photographic Equipment Co., Ltd., Zhongshan, Guangdong (CN)

(72) Inventor: Fan Xiao, Guangdong (CN)

(73) Assignee: ZHONGSHAN DASHAN PHOTOGRAPHIC EQUIPMENT CO., LTD., Zhongshan (CN)

( * ) Notice: Subject to any disclaimer, the term of this patent is extended or adjusted under 35 U.S.C. 154(b) by 0 days.

(21) Appl. No.: 15/361,512

(22) Filed: Nov. 28, 2016

(30) Foreign Application Priority Data

Aug. 12, 2016 (CN) .......................... 2016 1 0663220
Nov. 15, 2016 (CN) .......................... 2016 2 1227973

(51) Int. Cl.
*G03B 17/56* (2006.01)
*F16M 13/02* (2006.01)

(52) U.S. Cl.
CPC ........... *G03B 17/561* (2013.01); *F16M 13/02* (2013.01)

(58) Field of Classification Search
None
See application file for complete search history.

(56) References Cited

U.S. PATENT DOCUMENTS

| 4,347,013 A * | 8/1982 | Turner | F16M 11/041 248/186.1 |
| 9,588,047 B2 * | 3/2017 | Jungwirth | G01N 21/64 |
| 2005/0265711 A1 * | 12/2005 | Heibel | B60R 11/04 396/419 |
| 2014/0071339 A1 * | 3/2014 | Baker | H04N 5/2253 348/373 |
| 2014/0096467 A1 * | 4/2014 | Norton | E04F 13/0833 52/582.2 |
| 2015/0003820 A1 * | 1/2015 | Li | G03B 17/561 396/428 |
| 2015/0358523 A1 * | 12/2015 | Mohr | B64D 47/08 348/208.7 |
| 2016/0091780 A1 * | 3/2016 | Tiefenbrunn | G03B 17/561 396/419 |
| 2016/0139494 A1 * | 5/2016 | Tien | G03B 17/561 396/428 |
| 2017/0108760 A1 * | 4/2017 | Achenbach | G03B 17/561 |

\* cited by examiner

*Primary Examiner* — W B Perkey (57) ABSTRACT

A quick connection structure includes a base body, a locking sleeve slidably sleeved on the outside of the base body, a connection platform with a lower part sleeved in a connection hole of the base body, and a locking spring arranged at the lower part of the base body to make the locking sleeve reset upwards along the outer wall of the base body, wherein at least two sets of platform locking units are arranged in the base body. In the quick connection structure, after the hole wall of a tapered locking shaft hole of the locking sleeve releases the lock of a locking block while the locking sleeve sleeved on the outside of the base body slides downwards, the locking block moves outwards under the action of a locking block return spring, thus the connection platform for mounting an apparatus may be inserted.

3 Claims, 7 Drawing Sheets

QUICK CONNECTION STRUCTURE

CROSS REFERENCES TO RELATED APPLICATION

This application claims priority of Chinese patent application No. 201610663220.1 filed on Aug. 12, 2016 and Chinese Utility Model Application No. 201621227973.X filed on Nov. 15, 2016, the entire contents of which are hereby incorporated by reference.

TECHNICAL FIELD

The disclosure relates to a photographic apparatus, and in particular to a quick connection structure for photographic apparatus.

BACKGROUND

At present, after photographic apparatuses are connected, screws are generally used for locking and fastening, which results in slow connection and mounting between the photographic apparatuses and thus often delays the shooting time in the nick of time. As we know, in we-media era featured in capturing the splendid moment and pre-empting the release of headline news, time is life; therefore, how to improve the connection efficiency between photographic apparatuses becomes crucial.

SUMMARY

The disclosure aims to overcome the drawbacks of the existing technology and provide a quick connection structure which has a more reasonable structure and is easier and more convenient to operate and with which an apparatus, after connected and mounted to a proper location, may be self locked without other parts to screw and fasten.

In order to solve the above existing technical problem, the disclosure adopts the following technical scheme:

a quick connection structure, including a base body, a locking sleeve slidably sleeved on the outside of the base body, a connection platform with a lower part sleeved in a connection hole of the base body, and a locking spring arranged at the lower part of the base body to make the locking sleeve reset upwards along the outer wall of the base body, at least one set of platform locking unit being arranged in the base body, wherein the platform locking unit includes a locking block arranged in a through hole of the base body and a locking block return spring making the locking block reset outwards to touch the hole wall of a locking shaft hole of the locking sleeve, the locking shaft hole being a tapered hole with wider top and narrower bottom; the side wall of an insert column at the lower part of the connection platform is provided with a locking bayonet for receiving a locking platform of the locking block; and the locking spring has a greater elastic force than the locking block return spring.

In an improved scheme of the above quick connection structure, the end part of the locking platform of the locking block and the locking bayonet at the lower part of the connection platform are provided with a matched slope.

In an improved scheme of the above quick connection structure, the connection hole of the base body and the insert column at the lower part of the connection platform are respectively an oblique hole and an oblique column with wider top and narrower bottom; the lower side of the locking platform is a slope, the bottom surface of the locking bayonet of the insert column is a slope, and the locking bayonet has a bigger size than the locking platform of the locking block.

Compared with the existing technology, the disclosure has benefits as follows: in the quick connection structure, after the hole wall of the tapered locking shaft hole of the locking sleeve releases the lock of the locking block while the locking sleeve sleeved on the outside of the base body slides downwards, the locking block moves outwards under the action of the locking block return spring, thus the connection platform for mounting an apparatus may be inserted; then, upon release of the locking sleeve, after the locking sleeve is reset upwards under the action of the locking spring, the locking block slides towards the direction of the connection hole of the base body to be clamped into the locking bayonet at the lower part of the connection platform; in this way, the mounting and locking of the connection platform is completed automatically after the locking sleeve is reset, and other parts such as screw are not needed to lock the platform; therefore, the disclosure has a more reasonable structure and is more concise and convenient to operate.

The disclosure is described below in further detail in conjunction with accompanying drawings and specific embodiments.

DESCRIPTION OF THE EMBODIMENTS

The disclosure is a quick connection structure, which, as shown in FIG. 1 to FIG. 7, includes a base body 1, a locking sleeve 2 slidably sleeved on the outside of the base body 1, a connection platform 3 with a lower part sleeved in a connection hole 12 of the base body 1, and a locking spring 4 arranged at the lower part of the base body 1 to make the locking sleeve 2 reset upwards along the outer wall of the base body 1, at least one set of platform locking unit 5 being arranged in the base body 1, wherein the platform locking unit 5 includes a locking block 51 arranged in a through hole 11 of the base body 1 and a locking block return spring 52 making the locking block 51 reset outwards to touch the hole wall of a locking shaft hole 21 of the locking sleeve 2, the locking shaft hole 21 being a tapered hole wide at the top and narrow at the bottom; the side wall of an insert column 31 at the lower part of the connection platform 3 is provided with a locking bayonet 32 for receiving a locking platform 511 of the locking block 51; and the locking spring 4 has a greater elastic force than the locking block return spring 52. When the locking sleeve 2 finishes resetting, the locking platform 511 of the locking block 51 is clamped into the locking bayonet 32, the outer end face of the locking block 51 presses against the hole wall of the locking shaft hole 21 of the locking sleeve 2, in this way, the connection platform 3 cannot be pulled out, and thus realizes the placement and location thereof.

When the disclosure is used for connecting a photographic apparatus such as camera, first the apparatus is mounted onto the connection platform 3, then, while the inset column 31 at the lower part of the connection platform 3 is aligned to the connection hole 12 of the base body 1, the locking sleeve 2 is manually pulled downwards so that the locking sleeve 2 slides downwards by overcoming the action force of the locking spring 4, at this time the aperture of the locking shaft hole 21 facing the locking block 51 becomes larger and the locking block 51 in the through hole 11 slides outwards under the action of the locking block return spring 52; when the locking platform 511 of the locking block 51 leaves the connection hole 12 of the base body 1, the insert column 31 at the lower part of the connection platform 3 may be inserted into the connection hole 12 of the base body 1; then, upon release of the locking sleeve 2, the locking sleeve 2 is reset upwards under the action of the locking spring 4, at this time the locking block 51 slides inwards by means of the thrust of the hole wall of the tapered locking shaft hole 21 until the locking platform 511 of the locking block 51 is clamped into the locking bayonet 32 of the insert column 31, in this way, the connection platform 3 cannot be pulled out; thus, the quick connection and mounting of the photographic apparatus is completed.

From the above it can be seen that, in the disclosure, after the hole wall of the tapered locking shaft hole of the locking sleeve releases the lock of the locking block while the locking sleeve sleeved on the outside of the base body slides downwards, the locking block moves outwards under the action of the locking block return spring, thus the connection platform 3 for mounting an apparatus may be inserted; then, upon release of the locking sleeve, after the locking sleeve is reset upwards under the action of the locking spring 4, the locking block 51 slides towards the direction of the connection hole 12 of the base body 1 to be clamped into the locking bayonet 32 at the lower part of the connection platform 3; in this way, the mounting and locking of the connection platform 3 is completed automatically after the locking sleeve is reset, and other parts such as screw are not needed to lock the platform; therefore, the disclosure has a more reasonable structure and is more concise and convenient to operate.

Figure 1:
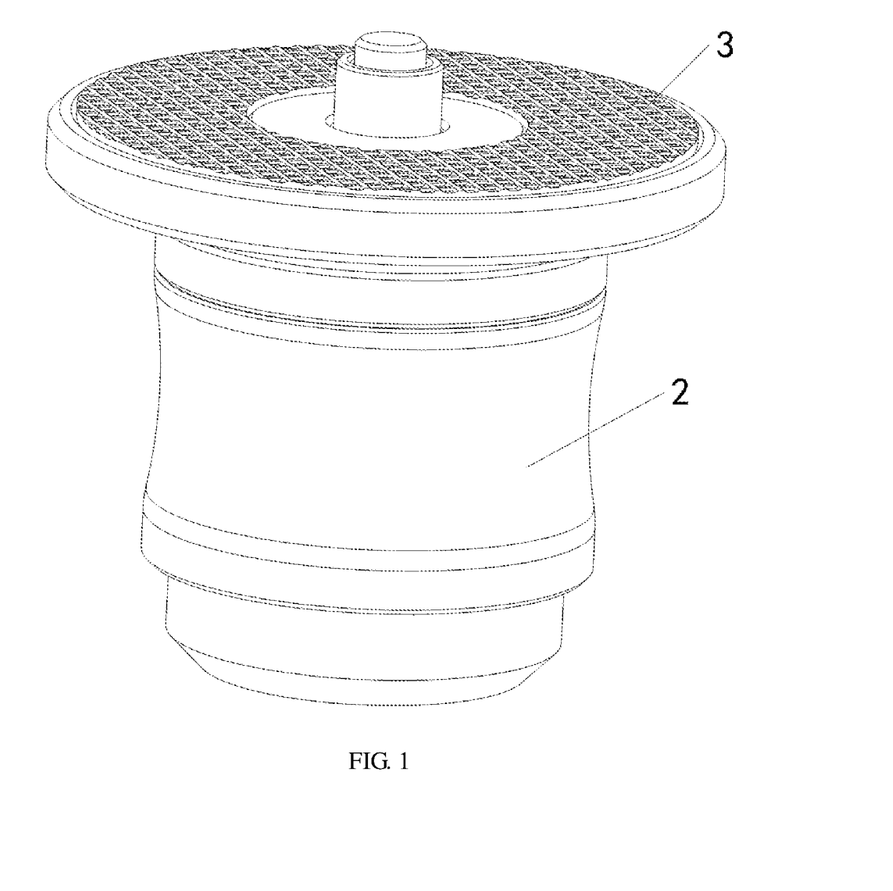
FIG. 1 is a perspective view 1 of an Embodiment 1 of the disclosure.
Figure 2:
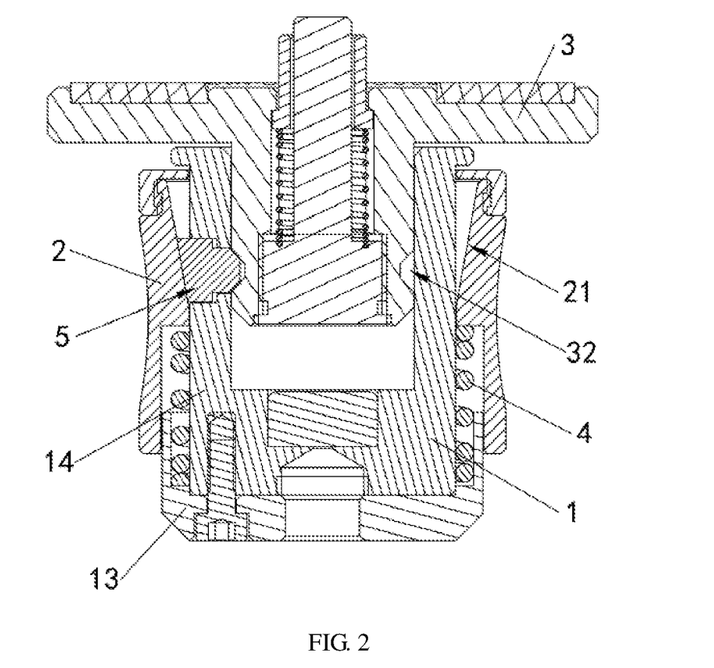
FIG. 2 is structure diagram 1 of the Embodiment 1 of the disclosure (longitudinal).
Figure 3:
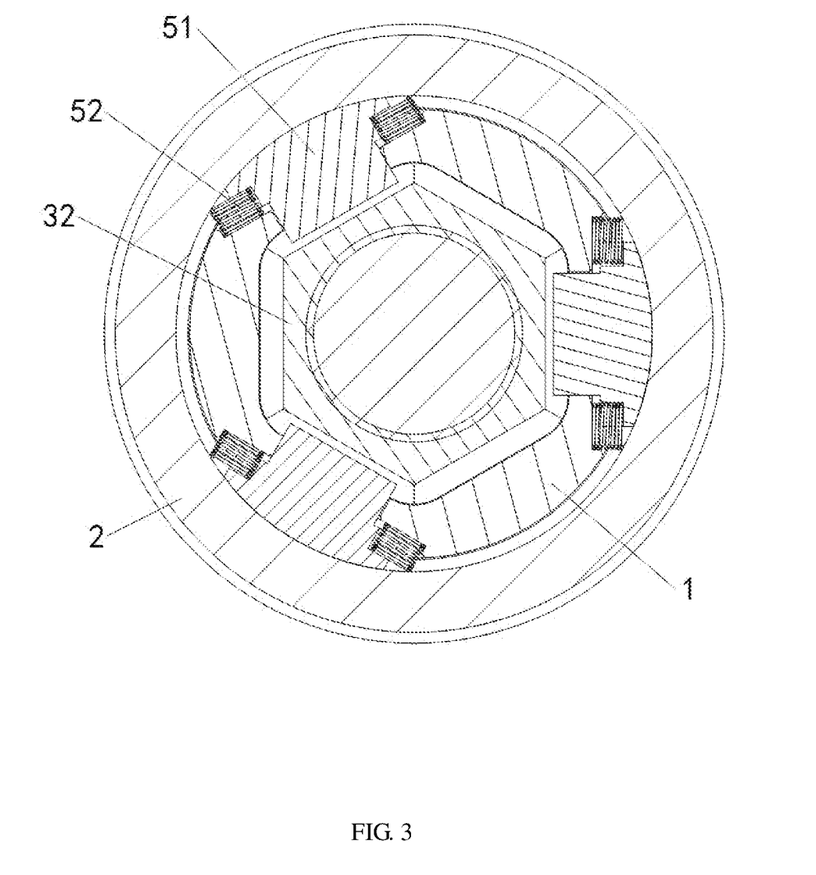
FIG. 3 is structure diagram 2 of the Embodiment 1 of the disclosure (horizontal).
Figure 4:
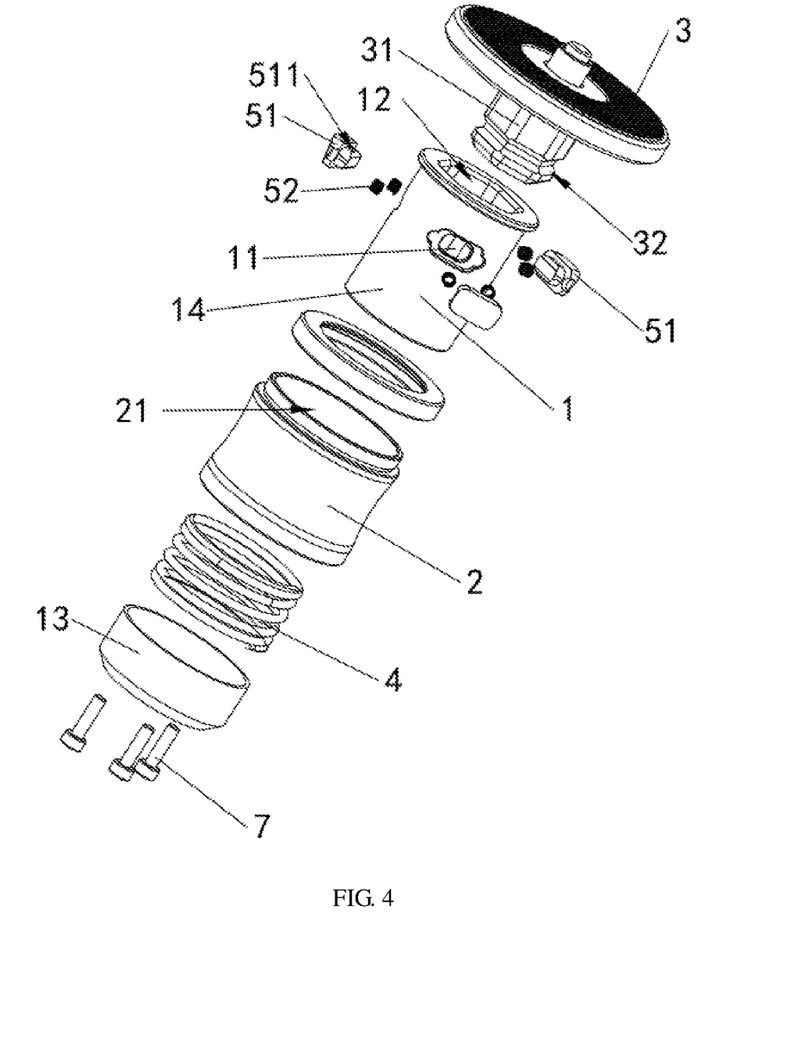
FIG. 4 is an assembly diagram of the Embodiment 1 of the disclosure.

In an Embodiment 1, as shown in FIG. 2 to FIG. 4, the end part of the locking platform 511 of the locking block 51 and the locking bayonet 32 at the lower part of the connection platform 3 are respectively provided with a matched slope, such that the locking bayonet 32 just clamps the upper and lower ends of the locking platform 511; in this way, it not only is convenient for the locking platform 511 to fall into the locking bayonet 32, but also reduces the looseness of the connection platform 3, thus the shake of photographic apparatus may be reduced.

Figure 5:
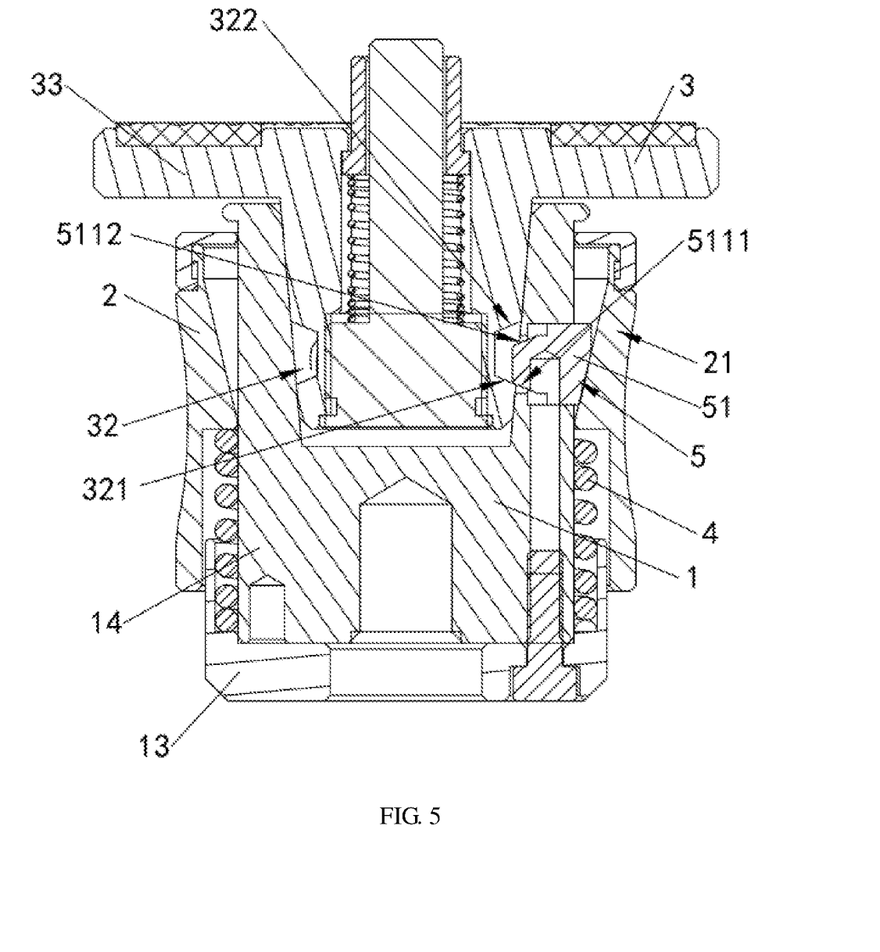
FIG. 5 is a structure diagram 1 of an Embodiment 2 of the disclosure (longitudinal).
Figure 6:
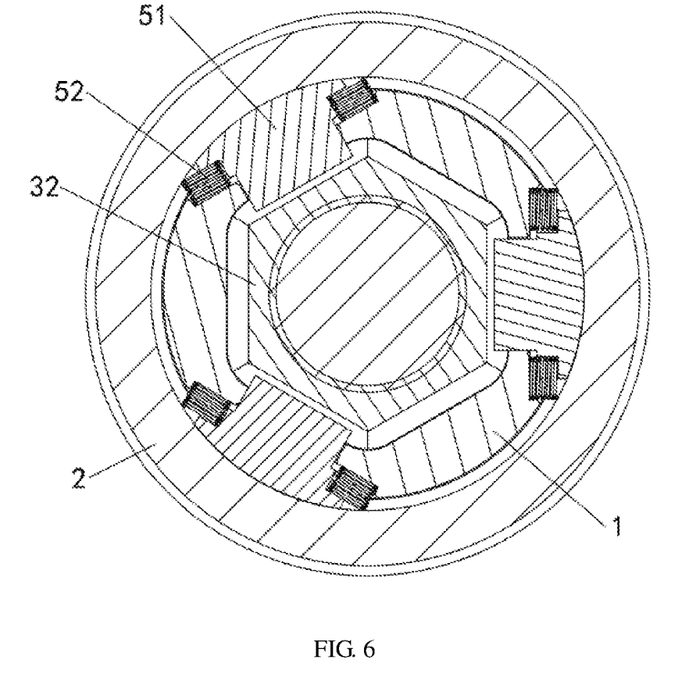
FIG. 6 is a structure diagram 1 of the Embodiment 2 of the disclosure (horizontal).
Figure 7:
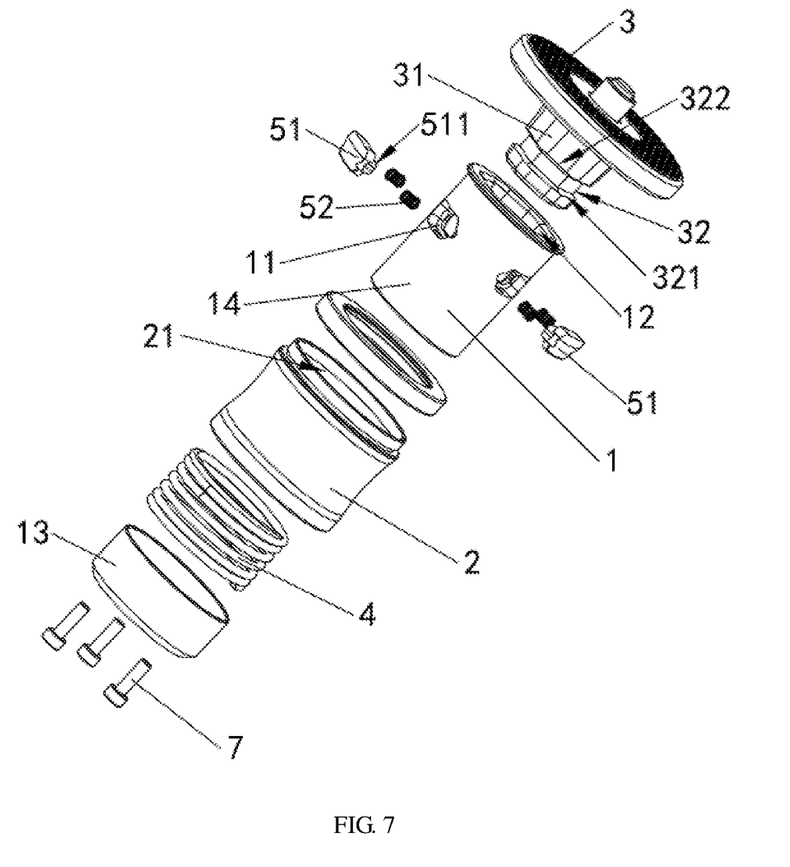
FIG. 7 is an assembly diagram of the Embodiment 2 of the disclosure.

In an Embodiment 2, as shown in FIG. 5 to FIG. 7, the connection hole 12 of the base body 1 and the insert column 31 at the lower part of the connection platform 3 are respectively an oblique hole and an oblique column with wider top and narrower bottom; a lower side 5111 of the locking platform 511 is a slope, a bottom surface 321 of the locking bayonet 32 of the insert column 31 is a slope, and the locking bayonet 32 has a bigger size than the locking platform 511 of the locking block 51 (such that the locking bayonet 32 does not interfere with the locking block 51 to pull downwards the connection platform 3); during usage, the oblique lower side 5111 of the locking platform 511 acts on the oblique bottom surface 321 of the locking bayonet 32 to pull downwards the connection platform 3, such that the insert column 31 of the connection platform 3 is more tightly adhered to the hole wall of the connection hole 12 of the base body 1; this construction has two benefits as follows: 1. Clearance between the insert column and the connection hole may be eliminated, thereby avoiding the looseness of the connection platform, that is, further reducing the shake of photographic apparatus, and further improving shooting quality; 2. After used for a period of time, even if abrasion occurs between the locking platform 511 and the locking bayonet 32 and between the insert column 31 and the connection hole 12 of the base body 1, since margin is reserved between the bottom surface of the insert column 31 and the bottom surface of the connection hole 12 of the base body 1, between the top surface of the base body 1 and the bottom surface of a support convex platform 33 of the connection platform 3 and between the insert column 31 and the vertical wall of the connection hole 12 of the base body 1, when the oblique lower side 5111 of the locking platform 511 acts on the oblique bottom surface 321 of the locking bayonet 32, the connection platform 3 may be pulled downwards to eliminate the shake of the connection platform 3 caused by abrasion, such that the stability of shooting quality still can be ensured in long-term use. In this embodiment, a top surface 322 of the locking bayonet 32 and an upper side 5112 of the locking platform 511 are oblique too, of course, they also may be straight.

In the Embodiment 1 and Embodiment 2, the insert column 31 of the connection platform 3 and the connection hole 12 of the base body 1 are hexagonal, or course, they also may be non-circular such as quadrangular, pentagonal and elliptic. In addition, in particular, there are three sets of platform locking units 5 in the Embodiment 1 and the Embodiment 2.

In the Embodiment 1 and Embodiment 2, the base body 1 includes a base 13 and a main body 14, which are fixed together through a screw 7.

The above are the preferred embodiments of the disclosure merely, but to limit the implementation scope of the disclosure. Any equivalent changes and modifications made based on the content of the patent scope applied for by the disclosure are intended to be within the technical scope of the disclosure.

What is claimed is:

1. A quick connection structure, comprising a base body, a locking sleeve slidably sleeved on the outside of the base body, a connection platform with a lower part sleeved in a connection hole of the base body, and a locking spring arranged at the lower part of the base body to make the locking sleeve reset upwards along the outer wall of the base body, at least one set of platform locking unit being arranged in the base body, wherein the platform locking unit comprises a locking block arranged in a through hole of the base body and a locking block return spring making the locking block reset outwards to touch the hole wall of a locking shaft hole of the locking sleeve, the locking shaft hole being a tapered hole with wider top and narrower bottom; the side wall of an insert column at the lower part of the connection platform is provided with a locking bayonet for receiving a locking platform of the locking block; and the locking spring has a greater elastic force than the locking block return spring.

2. The quick connection structure according to claim 1, wherein the end part of the locking platform of the locking block and the locking bayonet at the lower part of the connection platform are provided with a matched slope.

3. The quick connection structure according to claim 1, wherein the connection hole of the base body and the insert column at the lower part of the connection platform are respectively an oblique hole and an oblique column with wider top and narrower bottom; the lower side of the locking platform is a slope, the bottom surface of the locking bayonet of the insert column is a slope, and the locking bayonet has a bigger size than the locking platform of the locking block.

\* \* \* \* \*